United States Patent
Zulpa et al.

(10) Patent No.: US 6,650,954 B2
(45) Date of Patent: Nov. 18, 2003

(54) METHOD AND SYSTEM FOR IMPLEMENTING A PREFERRED PARTS PLAN OVER A COMMUNICATIONS NETWORK

(75) Inventors: Paul A. Zulpa, Woodbury, CT (US); William H. Cochran, Rochester, MN (US); Karen J. Gilsdorf, Mazeppa, MN (US); Gary A. Tressler, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 09/892,953

(22) Filed: Jun. 27, 2001

(65) Prior Publication Data

US 2003/0004597 A1 Jan. 2, 2003

(51) Int. Cl.[7] .............................................. G06F 19/00
(52) U.S. Cl. ......................... 700/107; 700/106; 705/29
(58) Field of Search ............... 705/28–29; 700/106–107

(56) References Cited

U.S. PATENT DOCUMENTS

| | | | |
|---|---|---|---|
| 5,920,867 A | * 7/1999 | Van Huben et al. | 707/101 |
| 6,336,053 B1 | * 1/2002 | Beatty | 700/108 |
| 6,493,679 B1 | * 12/2002 | Rappaport et al. | 705/29 |

* cited by examiner

Primary Examiner—Leo Picard
Assistant Examiner—Alexander Kosowski
(74) Attorney, Agent, or Firm—Timothy M. Farrell; Cantor Colburn LLP

(57) ABSTRACT

An exemplary embodiment of the invention relates to a method for facilitating a preferred parts plan for an enterprise over a computer network utilizing a parts review process tool. The method comprises: receiving a bill of material from a client system that includes a non-preferred part; storing the bill of material in a bill of material review database; periodically searching and extracting non-preferred parts records from the bill of material review database; importing the non-preferred parts records into a deviation database; evaluating risk factors associated with non-preferred parts usage; developing an action plan to mitigate risks in using the non-preferred parts; developing a preferred parts strategy for use in minimizing requests to use non-preferred parts; and communicating the preferred parts strategy over a computer network to enterprise client systems.

36 Claims, 5 Drawing Sheets

Requester Questionnaire

This is the section that the division representative needs to answer. The section is set up to ask a set of questions with set answers. The questions and answers are as follows:

406 — 1) Why are you using non-preferred parts?
- This device is Division Preferred
- Emerging Technology (Will be preferred at GA)
- Reused design (i.e. controller being reused, previously designed circuit, Software/Code frozen, etc.)
- Reusing a card
- *Device gives a competitive advantage
- *Only technical solution available
- Road map showed the part was preferred, but has since changed
- Device is sunset and capability to move to a replacement has been built into design
- OEM Request - Customer Controlled Design
- 2nd level design that uses preferred components
- Moved to a preferred solution post BRS Response
- Parts Database Problem (incorrect data)
- Test BOM (This request should be ignored as this is not a real BOM)

Comments: If you answer "Device is sunset and capability to move to a replacement has been built into design", you only need to answer questions 7 and 10. If you answer "Device gives a competitive advantage" or "Only technical solution available", you will be asked to fill in the following question:

**\*1A) Please describe how this solution gives a competitive advantage or why this is the only technical solution available:** _____

Comments: For question 2 through 5, we are interested in details regarding the business aspects of your program. Please include any known refreshes to the product that would extend the life of the program and affect the business aspects of the program.

408 — 2) What are the dollars saved by using this part (what would it have cost you to use a different part)? When determining the savings, please consider the number of people, time, rework cost, etc.
- $0 to $100K
- $101K to 500K
- $501K to $1M
- Greater than $1M 410 — 3) What is the expected life of your program?
- less than 1 Year
- 1 to 3 years
- 3 to 5 years
- greater than 5 years 412 — 4) What is the projected revenue of this program?
- Less than $1M
- $1M - $10M

FIG. 3A

5) What are your average expected yearly volumes for this part number?
- Less than 50K
- 50K - 500K
- 501K - 5M
- Greater than 5M

6) How does this product fit into your division strategy?
- Replacement to current offering
- New Application
- Other. Please explain:

7) What is the plan to move your products to Preferred Parts?
- No Plan  _____
- Migration path within current design
- Card redesign to replace current card If "Migration path within current design" or "Card redesign to replace current card" are chosen, answer the following questions:

7a) What is the timing for conversion to a preferred solution?
- Less than 1 year
- More than 1 year
- When existing solution is no longer cost effective

7b) What is the cost to convert to the preferred solution?
- $0-$10K
- $11K-$50K
- $51K-$100K
- Greater than $100K

7c) What is the criteria to convert to a preferred solution?
- Price Crossover needs to occur
- Current component is no longer available (end-of-life)
- Current component has a supply issue (constrained or allocated)
- Planned migration based on system road map (for card redesign)
- Competive requirement (for card redesign)

7d) What is the preferred solution?

8) Is your competition using a similar part?
- Yes
- No
- Not sure

9) Will there be other in-house users of your product or design?
- Yes
- No
- If "Yes", please list other in-house users of this product, including product refreshes. Include estimated GA date and life span for each entry.

10) Comments: Please provide comments to help the Technology Development council evaluate this request. Please provide additional information to explain above answers, describe the closed preferred solution and the things preventing you from using that solution, etc.

302 — | SUBMIT |

FIG. 3B

Council Evaluation

This is the section that the evaluation team uses to record their analysis of the request. The section is set up to ask a set of questions with set answers. The questions and answers are as follows:

i) What is the status of this request?
- Open: Under subteam review
- Closed: No further action is required
- Closed: Requester has withdrawn request from BOM
- Open: Evaluation team review required
- Open: Change to preferred solution requested
- Open: Immediate escalation required
- Closed: Escalation complete - Customer accepts risk
- Closed: Council Approved Risk

402 ii) Lessons Learned: Please list any things learned in the disposition of this Request that should be considered in future request reviews.

iii) Comments and Notes:

FIG. 4

METHOD AND SYSTEM FOR IMPLEMENTING A PREFERRED PARTS PLAN OVER A COMMUNICATIONS NETWORK

BACKGROUND

This invention relates generally to parts review processes in a manufacturing environment, and more particularly, the present invention relates to a method and system for reviewing parts usage, assessing related risks, developing an action plan for non-preferred parts, and providing this information to developers and procurement parties over a communications network.

It is generally known in the manufacturing industry that a product is only as good as its collective components. In the early design phase of a product development cycle, design engineers are tasked with selecting the parts that will be incorporated into a product design. While the selections made by the designer may be technically sound, they may not always be the most cost effective from a financial standpoint because the designer is not privy to important business data such as cost rebates available from a particular supplier. Further, these part selections may not be the most pragmatic from a logistical standpoint since the designer is not equipped with the business skills or knowledge of a procurement specialist. Procurement specialists evaluate the business risks associated with part selection by examining various factors such as reliability, supplier technology and capability, availability, etc. However, procurement specialists are not generally knowledgeable about the technical or functional aspects of the parts or assemblies. As a result, there may be parts used by development that include some business and/or technical risks. Currently, there is no way for an enterprise to alert its development personnel of these risks and no capability to assess the action plans in order to minimize them. It is, therefore, desirable to provide a method and system for reviewing parts usage, finding problems or risk parts, and defining the actions that should be taken to mitigate the risks.

BRIEF SUMMARY

An exemplary embodiment of the invention relates to a method for facilitating a preferred parts plan for an enterprise over a computer network utilizing a parts review process tool. The method comprises: receiving a bill of material from a client system that includes a non-preferred part; storing the bill of material in a bill of material review database; periodically searching an extracting non-preferred parts records from the bill of material review database; importing the non-preferred parts records into a deviation database; notifying a division representative assigned to the non-preferred parts records along with a link to a site questionnaire;

receiving answers to the site questionnaire; sending a notice to an evaluation team including a request to evaluate non-preferred parts usage relating to the non-preferred parts; evaluating risk factors associated with the non-preferred parts usage; developing an action plan to mitigate risks in using the non-preferred parts; developing a preferred parts strategy for use in minimizing requests to use non-preferred parts; and communicating the preferred parts strategy over a computer network to enterprise client systems.

BRIEF DESCRIPTION OF THE DRAWINGS

Referring now to the drawings wherein like elements are numbered alike in the several FIGURES:

FIGS. 3A and 3B illustrate an exemplary division questionnaire for providing parts usage information to the parts review process tool; and FIG. 4 is an exemplary evaluation questionnaire for assisting an evaluation team in assessing parts usage, risks, and developing an action plan.

DETAILED DESCRIPTION OF THE PREFERRED EMBODIMENT

Figure 1:
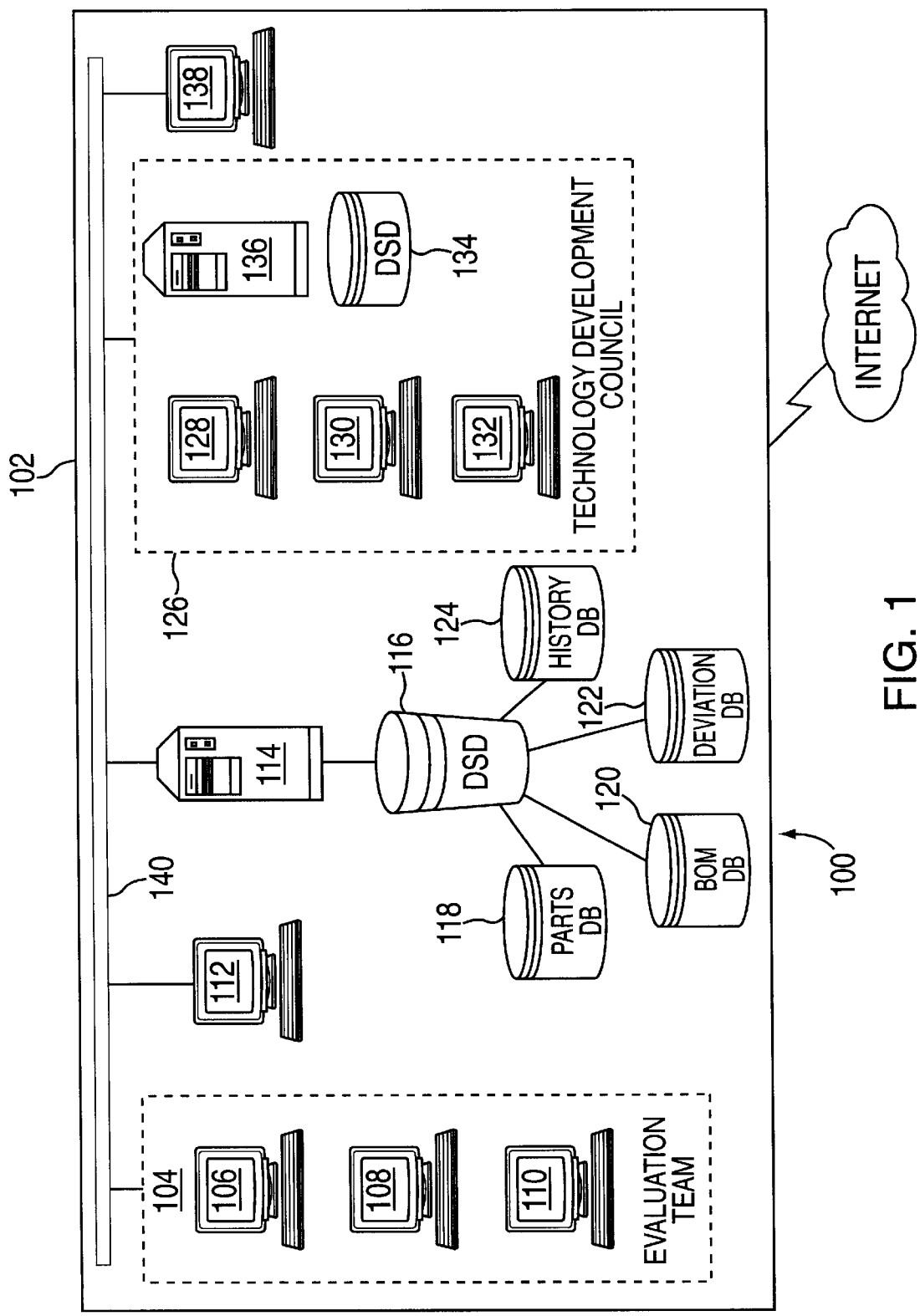
FIG. 1 is a block diagram of computer network system in which the parts review process tool is implemented in a preferred embodiment of the invention.

In a preferred embodiment, evaluation teams and council members for an enterprise determine which components a designer should consider first for use in a design. These components are referred to as 'preferred parts'. Using a preferred part may mean that development and procurement experts who make up these teams/councils have determined that the part is readily available in the industry (no supply issues), is technically sound, will be available throughout the life of a specified program, and is being procured at the lowest cost available. It is understood that other criteria may be used to determine a preferred part.

A preferred part is one that the technology development councils have determined to be of more value to the enterprise from a technical and business standpoint as compared to another part. Preferred parts are further defined by two areas—technology and suppliers. The following criteria are used for defining preferred parts according to technology.

Industry standard. This element is concerned with whether or not the part is readily available from the industry. Wide acceptance of a part in the industry usually means good supply and price.

Number of suppliers. The number of suppliers producing the technology is helpful in assessing whether or not sufficient suppliers exist to satisfy enterprise and industry demand.

Continuity of supply. This factor addresses whether there are any known issues or technical events that may affect supply. For example, a natural disaster such as an earthquake or a serious fire may affect a supplier's ability to manufacture parts.

Adequate lead times/capacity. This element is concerned with the amount of planning needed to ensure continuity of supply. Long lead times usually mean insufficient supply.

Quality/reliability. This element addresses whether or not there are any known issues that may affect the enterprise's ability to ship a product due to a supplier's manufacturing and/or design issue.

Manufacturability. This factor establishes whether the technology under evaluation lends itself to problem free assembly in the enterprise-designated assembly facility. For example, a certain package design may be more difficult to solder onto a card versus another package design.

Technical advantage. This element assesses whether the use of this technology gives the enterprise a technical advantage in the market place. For example, one type of part may increase a machine's technical performance as compared to another type of part (microprocessor A works better in a design than microprocessor B).

Position in the technology life cycle. This item addresses whether this technology will be available for the life of an enterprise program or whether there will be a need to execute an end-of-life exercise. An end-of-life exercise includes analysis of total parts requirements (from many machines or designs) for the remainder of a manufacturing period (e.g., from today until the date manufacturing will stop), establishing supply to fulfill those requirements, and inventory storage of the parts.

The following criteria are used for defining preferred parts according to supplier selection.

Supplier technology. Suppliers are compared to one another in the areas of quality/reliability; the ability to offer leading edge technology, steps they are taking to improve technology, and the ease with which the supplier may be qualified for the enterprise's products.

Supplier menu. Supplier menu refers to the nature and scope of its product offerings and how well the supplier's offerings match enterprise needs (i.e., technology road map convergence as discussed further herein).

Pricing. This factor looks not only at current price offerings but also whether the supplier provides aggressive pricing throughout the product life, whether the pricing is aggressive in beating the market average, and whether the supplier's pricing is aggressive across its entire offering as opposed to only select areas.

Capacity. Capacity refers to whether the supplier has the manufacturing capacity to meet enterprise or industry demand and whether it is flexible in moving from one product set to another if market conditions dictate a change.

Service. This factor assesses a supplier's serviceability to the enterprise in terms of delivery, communication, recovery capability, technical support and Electronic Data Interchange capability.

In addition to the above-described criteria, other factors may be employed by an enterprise as desired in order to establish a preferred parts definition. It should be noted that the parts review process tool can be implemented for use in any electronics-based industry.

In contrast to preferred parts described above, non-preferred parts are those which have been found to have some type of associated risk that needs to be addressed. There are varying degrees of risk based on the enterprise's business and technical requirements. Risk types range from a part that will go end-of-life during the time which the product will be using the part to a part that is no longer available requiring the substitution of a new part. Utilizing the technology and supplier criteria listed above, the parts review process tool's action plan will be executed only on these non-preferred parts to determine if the risk of using this part may impact the program's revenue commitment. If the risk is accepted, a mitigation plan will be developed to minimize the risk.

Once a strategy or preferred parts action plan is in place, it is communicated to all development personnel and other interested parties of the enterprise via a web site. The web site contains a visual picture of the strategy, i.e., roadmap, a methodology to find a list of parts that match the roadmap, a contact list, a price projection, and market conditions (current and future predicted).

Establishing a preferred parts list is only a portion of the process necessary to ensure that optimal resources are being utilized by the enterprise. A preferred part can easily become non-preferred overnight. Ongoing reviews of technology and suppliers qualifications may be necessary. Existing parts become obsolete while emerging technologies continue to offer new and improved parts in the market place.

Furthermore, design groups may tend to develop loyalties to existing parts with which they are familiar, without consideration of whether the parts continue to be cost effective for the enterprise.

The parts review tool of the present invention provides a means for information gathering of parts usage, collaborative evaluation of technical properties and business factors relating to parts available in the industry, and deployment of preferred parts strategies via a communications network across an enterprise.

In an exemplary embodiment, the parts review process tool is implemented via a network system such as that depicted in FIG. 1. System 100 includes enterprise 102 which is operating in a client/server architecture mode whereby groupware applications and file distribution software are executed by system server 114 and/or council server 136 on behalf of requesting client systems 106, 108, 110, 112, 128, 130, 132, and 138. Groupware applications are well known to those skilled in the art and include email, messaging, calendaring, and a host of multi-media tools. Likewise, client systems of enterprise 102 employ suitable client-side applications for facilitating the groupware tools utilized by enterprise 102 such as web browser programs and email software. Enterprise 102 is also executing application software used by the parts review process tool including spreadsheet software such as Lotus 1-2-3 (TM) and database management software such as IBM's DB2 (TM). Enterprise 102 further comprises an evaluation team 104 with client systems 106, 108, and 110, each in communication via a communications link 140. Client system 106 represents a procurement engineer, system 108 represents a procurement business specialist, and system 110 represents a development engineer. It is understood that any number of client systems may be used in order to realize the advantages of the invention. Evaluation team 104 evaluates non-preferred parts usage for divisions of enterprise 102 with respect to a commodity. Evaluation team 104 is responsible for looking at the non-preferred parts usage, determining any associated risks in using the part, and developing an action plan designed to minimize these risks. Evaluation team 104 pulls business people from procurement and technical people from both procurement engineering and development. Enterprise 102 may support evaluation teams for each commodity related to its business and commodity evaluation teams may be further broken down as needed into sub-commodity teams or otherwise as needed.

Client system 112 represents a design engineer from a division of enterprise 102 who designs and develops electronic assemblies or products for enterprise 102. Client system 112 is also connected to communications link 140. System server 114 provides typical engineering resources to employees of enterprise 102 such as CAD software and other design tools. Server 114 also retrieves data stored in data storage device 116 for use by authorized client systems of enterprise 102. Data storage device 116 houses databases used by enterprise 102 employees including the parts review process tool of the invention. Databases of data storage device 116 include a parts database 118, a bill of material (BOM) review database 120, a deviation database 122, and a history database 124 all of which are explained further herein.

Parts database 118 contains a list of all part numbers utilized by enterprise 102 as well as associated data. The preferred definition, as well as a description of the part, comes from database 118.

BOM review database 120 contains a list of parts that make up different parts of a machine as entered on a bill of material. Bills of materials are submitted by developers of enterprise 102 such as design engineer client system 112 who requests that a new part be released or to determine the current status of a part in parts database 118. Deviation database 122 uses database 120 as the main source for determining which parts need to be reviewed by evaluation team 104.

Deviation database 122 contains all non-preferred parts extracted from database 120 along with key data that identifies the part and the program that uses the part. This database also contains data describing why the part was used and the status of the risk review.

Figure 2:
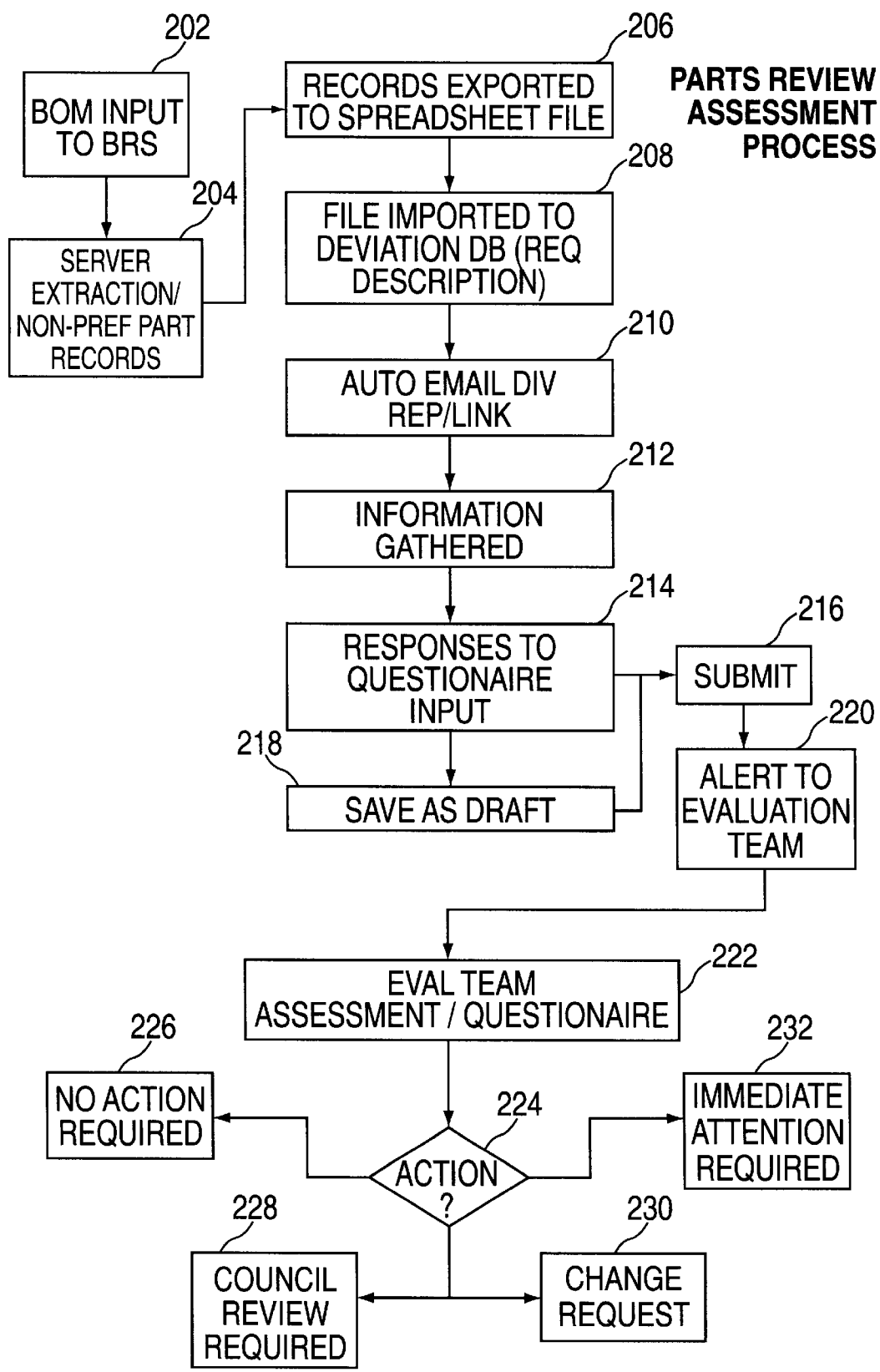
FIG. 2 is a flowchart describing the process of implementing a non-preferred parts review.

History database 124 stores the results of the evaluations performed for statistical and trend analysis as described further herein and in FIG. 2.

Also included in enterprise 102 is technology development council 126 which comprises client systems 128, 130, and 132. Technology development council 126 is responsible for defining and communicating the preferred parts policies on an enterprise-wide level. Technology council 126 is commissioned to develop and communicate to enterprise 102 and suppliers a consistent strategy regarding enterprise 102's use of designated parts. Council 126 may be staffed from technical members of each division of enterprise 102 and from procurement engineering. Due to the complex nature of some divisions, it may be appropriate to include multiple people from the same division sitting on the council. Client system 128 represents a representative of a division's development group, client system 130 represents a procurement representative, and client system 132 represents a representative of another division's development group. It is understood that any number of client systems may be used by enterprise 102. Numerous division representatives may be assigned to the council and numerous councils may be created as needed. One council person from each division is selected to be the deviation process focal point for that division. This division representative is responsible for gathering the data needed to evaluate the non-preferred parts use. Council 126 also employs council server 136 for accessing the parts review process tool and retrieving information from data storage device 134 as needed.

Client system 138 represents a system administrator for enterprise system 102 who assists in transporting the bill of material data provided by a design engineer client system 112 to deviation database 122 for assessment. System administrator client system 138 is described further in FIG. 2. Enterprise 102 is connected to a network (e.g., Internet) in order to facilitate communications with outside entities.

FIG. 2 illustrates the process involved in establishing and communicating a preferred parts usage plan in a preferred embodiment of the invention. A design engineer of enterprise 102 inputs a bill of materials into BOM review database 120 via client system 112 at step 202. On a periodic basis (e.g., weekly), system server 114 performs extractions from BOM review database 120 of non-preferred parts appearing on the stored bills of material at step 204. The extraction records are exported to a spreadsheet file at step 206. This step is used where outputs obtained from database 120 are incompatible with information supplied by deviation database 122, however, it may be eliminated by integrating the two databases via systems software or hardware. Division representative 128 of technology development council 126 is identified and associated with each record in the file by comparing data contained in the extraction record to data provided by deviation database 122. The system administrator at client system 138 imports the spreadsheet file to deviation database 122 at step 208 where irrelevant data is filtered out from the record and relevant data is captured. Enterprise 102 may establish the criteria to be used for defining relevant data. Again, the tool may perform the importation of the non-preferred parts records from database 120 directly to deviation database 122, thus bypassing steps 206 and 208 where the two databases have been integrated as described above. The filtered records in the file are stored in forms referred to as Request Descriptions in deviation database 122. The following information fields may be included in the Request Description form and are used by the tool to identify the program that is requesting the parts, as well as to describe the part being requested.

Division. Name of the division that requested the part.

Technology Development Council Representative. The division representative that is responsible for completing the Requester Questionnaire (shown in FIGS. 3A and 3B).

BOM Technical Contact. The technical person responsible for this BOM as identified in BOM database 120.

Responsible Engineer. The design engineers responsible for this BOM as identified in BOM database 120.

BOM Name. Bill of materials name as identified in BOM database 120.

Assembly PN. Assembly part number as identified in BOM database 120.

Enterprise PN. Part number of the component used in the assembly as identified in BOM database 120.

Product Description. Brief description of product as identified in BOM database 120.

Product GA. Date for general availability. This information is obtained by the division representative via the questionnaire of FIGS. 3A and 3B.

Program Manager. Manager for the design project. This information is obtained by the division representative via the questionnaire of FIGS. 3A and 3B.

Supplier Name. Supplier Name as identified in BOM database 120.

Classification. Part classification or category as identified in BOM database 120.

Type. Part type as identified in BOM database 120.

Other information such as size, units, density may be included here as well.

Deviation database 122 automatically notifies division representative 128 by email along with a link to the site questionnaire (also referred to as requester questionnaire) of FIG. 3 at step 210. Division representative 128 then contacts the project design team (not shown) of the BOM which comprises the design engineer of client system 112 and an engineering group to which the design engineer is assigned. Division representative 128 then gathers the information requested by the questionnaire at step 212. The responses to the questionnaire are then inputted by division representative 128 at step 214 followed by selecting the submit button 302 of FIG. 3B at step 216. Alternatively, the division representative 128 may enter information and save it as a draft (not shown) at step 218 if the data requested is still forthcoming. Once submitted, an alert is sent by the tool to evaluation team 104 notifying them that an assessment is required at step 220. The evaluation team reviews the request/response and accesses related data from parts database 118, BOM database 120, Deviation database 122, history database 124, along with market analysis and industry trends for consideration. A questionnaire is provided by the tool as illustrated in FIG. 4 to aid team 104 in their assessment. Once completed, there are four courses of action possible for the evaluation team (step 224). At step 226, if the risk is determined to be low, no action may be required. For example, the part is non-preferred because it is a card made for only one machine (wide usage is one of the requirements for preferredness). If the card is built with components that are preferred, the risk is low, thus no action is required. Another example might be where the system has a migration path to allow replacement of the non-preferred part with a preferred part and has a plan to move to the preferred solution when necessary.

A second course of action requires council review at step 228. This is where evaluation team 104 feels that technology development council 126 should reevaluate its position regarding the status of this part. A third course of action requests that a change be implemented at step 230. The evaluation team has reviewed the data and has determined that the risk is too high to allow the use of the non-preferred part. A request has been made to the developer to modify the design to use a preferred part. Finally, at step 232 immediate attention may be required where the device being used is very high risk. This may require that an action plan be developed to reduce or eliminate the risk. Typical conditions that would trigger this response would include the use of an end-of-life component or a component from a high risk supplier.

All evaluations and results are saved to history database 124 for future assessments and trend analysis. Once the data begins to flow into the database, analysis is critical to determine the steps needed to drive down the non-preferred parts request percentage. Measurements can be broken down into two sections: Database Management and Trend Analysis.

Database management provides that turnaround time and form closure are tracked to make sure the forms are being closed on a timely basis. The following details may be measured on a site-by-site basis: turnaround time from start to finish, turnaround time to close the requester questionnaire (measured from time note was sent), turnaround time to close the evaluation (measured from time requester closes section), and status 402 of FIG. 4.

Trend analysis include trends such as why a division is using a non-preferred part will help the council in developing action plans that will help drive the non-preferred request percentage down. The following areas will be grouped by site and division and the results evaluated: action 402 of FIG. 4, requester response distributions by division; why are you using non-preferred parts, action 406 of FIG. 3A; what are the dollars saved by using this part, action 408 of FIG. 3A; what is the expected life of the program, action 410 of FIG. 3A, what is the projected revenue of this program, action 412 of FIG. 3A; and what are the average expected yearly volumes for this part number, action 414 of FIG. 3B.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for facilitating a preferred parts plan for an enterprise over a computer network, comprising:

receiving a bill of material from a client system, said bill of material including a non-preferred part;

storing said bill of material in a bill of material review database;

periodically searching said bill of material review database for non-preferred parts; records;

extracting non-preferred parts records from said bill of material review database;

importing said non-preferred parts records into a deviation database;

notifying a division representative, said notifying including sending a link to a site questionnaire;

receiving a response from said division representative, said response including answers to said site questionnaire;

sending a notice to an evaluation team as a result of said receiving said response, said notice including a request to evaluate non-preferred parts usage;

evaluating risk factors associated with said non-preferred parts usage by said evaluation team;

developing an action plan in response to said evaluating said risk factors;

developing a preferred parts strategy; and making said preferred parts strategy available to said client system over said computer network; wherein said facilitating said preferred parts plan is accomplished by a parts review process tool.

2. The method of claim 1, further comprising:

storing preferred parts plans in a history database; and performing trend analyses utilizing data provided in said preferred parts plans.

3. The method of claim 1, further comprising:

performing database management functions utilizing data stored in said deviation database.

4. The method of claim 1, wherein said non-preferred part includes a part determined to have a risk associated with usage of said part.

5. The method of claim 1, wherein said importing said records into said deviation database includes filtering out irrelevant data and capturing relevant data, said relevant data defined by said enterprise.

6. The method of claim 5, further comprising:

associating said relevant data with information fields in a request description form.

7. The method of claim 6, wherein said information fields include:

a division;

a technology development council representative;

a bill of material technical contact;

a responsible engineer;
a bill of material name;
an assembly part number;
an enterprise part number;
a product description;
a product general availability date;
a program manager;
a supplier name;
a part classification;
a part type; and
data related to a part unit of measure.

8. The method of claim 1, wherein said answers to said site questionnaire include:
  a reason for using said part;
  a technical advantage in using said part;
  a cost effectiveness determination of using said part; and
  environmental data relating to a program for which said part belongs.

9. The method of claim 1, wherein said developing said preferred parts strategy includes examining criteria related to technology factors.

10. The method of claim 9, wherein said technology factors include:
  industry standards;
  number of suppliers producing a technology;
  continuity of supply;
  adequate lead time;
  capacity;
  quality;
  reliability;
  manufacturability;
  technical advantages; and
  position in technology lifecycle.

11. The method of claim 1, wherein said developing said preferred parts strategy includes examining criteria related to supplier factors.

12. The method of claim 11, wherein said supplier factors include:
  supplier technology;
  supplier menu;
  supplier pricing;
  supplier capacity; and
  supplier service.

13. The method of claim 1, wherein said developing said action plan includes identifying a risk level; wherein further said risk level causes said evaluation team to perform one of:
  taking no action;
  requiring council review;
  changing a request relating to said bill of material; and
  requiring immediate attention.

14. The method of claim 1, wherein said preferred parts plan includes:
  a road map of said preferred parts strategy;
  a methodology for finding a list of parts that match said road map;
  a contact list;
  a price projection; and
  market conditions associated with said preferred parts strategy.

15. A storage medium encoded with machine-readable computer program code for facilitating a preferred parts plan for an enterprise over a computer network, the storage medium including instructions for causing a computer to implement a method comprising:
  receiving a bill of material from a client system, said bill of material including a non-preferred part;
  storing said bill of material in a bill of material review database;
  periodically searching said bill of material review database for non-preferred parts records;
  extracting non-preferred parts records from said bill of material review database;
  importing said non-preferred parts records into a deviation database;
  notifying a division representative, said notifying including sending a link to a site questionnaire;
  receiving a response from said division representative, said response including answers to said site questionnaire;
  sending a notice to an evaluation learn as a result of said receiving said response, said notice including a request to evaluate non-preferred parts usage;
  evaluating risk factors associated with said non-preferred parts usage by said evaluation team;
  developing an action plan in response to said evaluating said risk factors;
  developing a preferred parts strategy; and
  making said preferred parts strategy available to said client system over said computer network; wherein said facilitating said preferred parts plan is accomplished by a parts review process tool.

16. The storage medium of claim 15, further comprising instructions for causing a computer to implement:
  storing preferred parts plans in a history database; and
  performing trend analyses utilizing data provided in said preferred parts plans.

17. The storage medium of claim 15, further comprising instructions for causing a computer to implement:
  performing database management functions utilizing data stored in said deviation database.

18. The storage medium of claim 15, wherein said non-preferred part includes a part determined to have a risk associated with usage of said part.

19. The storage medium of claim 15, wherein said importing said records into said deviation database includes filtering out irrelevant data and capturing relevant data, said relevant data defined by said enterprise.

20. The storage medium of claim 19, further comprising instructions for causing a computer to implement:
  associating said relevant data with information fields in a request description form.

21. The storage medium of claim 20, wherein said information fields include:
  a division;
  a technology development council representative;
  a bill of material technical contact;
  a responsible engineer;
  a bill of material name;
  an assembly part number;
  an enterprise part number;
  a product description;
  a product general availability date;
  a program manager;
  a supplier name;
  a part classification;

a part type; and data related to a part unit of measure.

22. The storage medium of claim 15, wherein said answers to said site questionnaire include:
  a reason for using said part;
  a technical advantage in using said part;
  a cost effectiveness determination of using said part; and
  environmental data relating to a program for which said part belongs.

23. The storage medium of claim 15, wherein said developing said preferred parts strategy includes examining criteria related to technology factors.

24. The storage medium of claim 23, wherein said technology factors include:
  industry standards;
  number of suppliers producing a technology;
  continuity of supply;
  adequate lead time;
  capacity;
  quality;
  reliability;
  manufacturability;
  technical advantages; and
  position in technology lifecycle.

25. The storage medium of claim 15, wherein said developing said preferred parts strategy includes examining criteria related to supplier factors.

26. The storage medium of claim 25, wherein said supplier factors include:
  supplier technology;
  supplier menu;
  supplier pricing;
  supplier capacity; and
  supplier service.

27. The storage medium of claim 15, wherein said developing said action plan includes identifying a risk level; wherein further said risk level causes said evaluation team to perform one of:
  taking no action;
  requiring council review;
  changing a request relating to said bill of material; and
  requiring immediate attention.

28. The storage medium of claim 15, wherein said preferred parts plan includes:
  a road map of said preferred parts strategy;
  a methodology for finding a list of parts that match said road map;
  a contact list;
  a price projection; and
  market conditions associated with said preferred parts strategy.

29. A system for facilitating a preferred parts plan for an enterprise over a computer network, comprising:
  an evaluation team client system;
  a client system;
  a technology development council client system;
  a data storage device;
  a server;
  a communications link for allowing said evaluation team client system, said client system, said technology development council client system, and said data storage device to communicate with each other;
  a network connection for communicating with entities outside of said enterprise; and
  a parts review process tool executed by said enterprise, said parts review process tool coordinating said client system, said evaluation team client system, and said technology development council client system to define a preferred parts plan for said enterprise;
  wherein said preferred parts plan is implemented via a method comprising:
    receiving a bill of material from a client system, said bill of material including a non-preferred part;
    storing said bill of material in a bill of material review database;
    periodically searching said bill of material review database for non-preferred parts records;
    extracting non-preferred parts records from said bill of material review database;
    importing said non-preferred parts records into a deviation database;
    notifying a division representative, said notifying including sending a link to a site questionnaire;
    receiving a response from said division representative, said response including answers to said site questionnaire;
  sending a notice to an evaluation team as a result of said receiving said response, said notice including a request to evaluate non-preferred parts usage;
  evaluating risk factors associated with said non-preferred parts usage by said evaluation team;
  developing an action plan in response to said evaluating said risk factors; and
  developing a preferred parts strategy.

30. The system of claim 29, wherein said data storage device includes:
  a parts database;
  a bill of material database;
  a deviation database; and
  a history database.

31. The system of claim 29, wherein said server provides resources to said enterprise, including:
  computer aided drafting tools;
  design tools;
  communication tools;
  data retrieval from said data storage device; and
  said parts review process tool.

32. The system of claim 30, wherein said parts database stores:
  part numbers;
  preferred definitions; and
  part descriptions.

33. The system of claim 30, wherein said bill of material database stores bills of materials including parts data associated with an assembly.

34. The system of claim 30, wherein said deviation database stores non-preferred parts data extracted from said data storage device.

35. The system of claim 34, wherein said non-preferred parts data includes:
  source of non-preferred parts usage; and
  status of risk review associated with non-preferred parts.

36. The system of claim 30, wherein said history database stores results of evaluations performed for said non-preferred parts data.

* * * * *